(12) United States Patent
Caruel et al.

(10) Patent No.: US 8,985,508 B2
(45) Date of Patent: Mar. 24, 2015

(54) SUSPENSION ASSEMBLY FOR AN AIRCRAFT TURBOJET ENGINE

(75) Inventors: Pierre Caruel, Le Havre (FR); Guy Bernard Vauchel, Harfleur (FR)

(73) Assignee: Aircelle, Gonfreville l'Orcher (FR)

( * ) Notice: Subject to any disclaimer, the term of this patent is extended or adjusted under 35 U.S.C. 154(b) by 761 days.

(21) Appl. No.: 13/146,211

(22) PCT Filed: Jan. 21, 2010

(86) PCT No.: PCT/FR2010/050090
§ 371 (c)(1),
(2), (4) Date: Jul. 26, 2011

(87) PCT Pub. No.: WO2010/089487
PCT Pub. Date: Aug. 12, 2010

(65) Prior Publication Data
US 2011/0284686 A1    Nov. 24, 2011

(30) Foreign Application Priority Data

Feb. 4, 2009    (FR) ...................................... 09 00470

(51) Int. Cl.
*B64D 27/18*    (2006.01)
*B64D 27/12*    (2006.01)
*B64D 27/26*    (2006.01)
*B64D 29/06*    (2006.01)

(52) U.S. Cl.
CPC ................ *B64D 27/26* (2013.01); *B64D 29/06* (2013.01); *B64D 2027/268* (2013.01); *Y02T 50/44* (2013.01)

USPC ............................................... 244/54; 60/796

(58) Field of Classification Search
CPC ........ B64D 27/12; B64D 27/14; B64D 27/20; B64D 27/26
USPC ....................... 244/53 R, 54; 248/554; 60/796
See application file for complete search history.

(56) References Cited

U.S. PATENT DOCUMENTS

| 2,655,090 | A | 8/1949 | Savard | |
| 2,724,948 | A | 10/1954 | Hiscock | |
| 5,385,013 | A | 1/1995 | Barron et al. | |
| 5,746,391 | A * | 5/1998 | Rodgers et al. | 244/54 |
| 6,227,485 | B1 * | 5/2001 | Porte | 244/54 |
| 6,935,591 | B2 * | 8/2005 | Udall | 244/54 |
| 2008/0067287 | A1 * | 3/2008 | Guibert et al. | 244/54 |

FOREIGN PATENT DOCUMENTS

FR    2891250 A1    3/2001

OTHER PUBLICATIONS

International Serach Report PCT/FR2010/050090; Dated May 3, 2010.

* cited by examiner

*Primary Examiner* — Rob Swiatek
(74) *Attorney, Agent, or Firm* — Brinks Gilson & Lione

(57) ABSTRACT

A suspension assembly for an aircraft turbojet engine includes a pylon and connecting rods for taking up the thrust of the turbojet engine which is connected to the pylon. In particular, the suspension assembly includes an insulator which is separate from the pylon and thermally insulates the connecting rods from the turbojet engine.

9 Claims, 4 Drawing Sheets

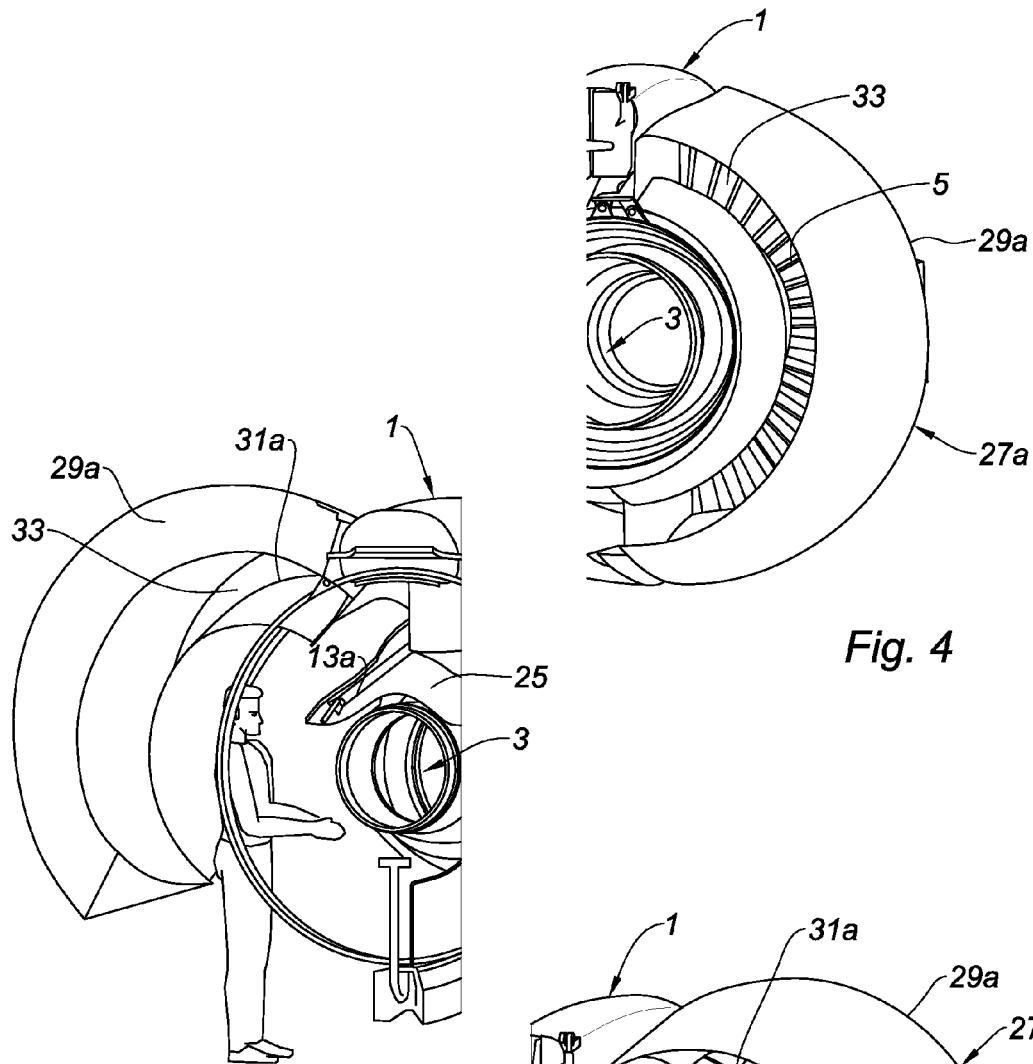
Fig. 4
Fig. 5
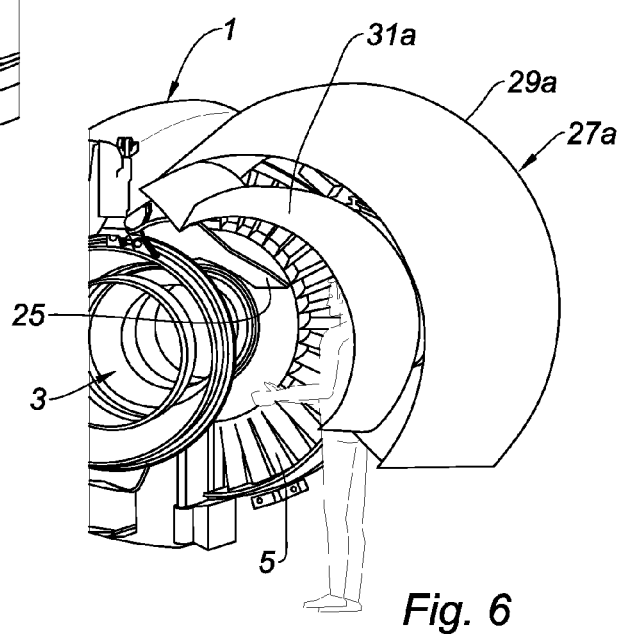
Fig. 6

SUSPENSION ASSEMBLY FOR AN AIRCRAFT TURBOJET ENGINE

TECHNICAL FIELD

The present invention relates to a suspension assembly for an aircraft turbojet engine, and a propulsion assembly comprising such a suspension assembly, a turbojet engine, and a nacelle.

BACKGROUND

As is known from the prior art, an aircraft turbojet engine assembly is housed inside a nacelle connected to a pylon allowing the propulsion assembly thus formed to be suspended under a wing of the aircraft or adjacent to the fuselage.

Connecting rods for taking up thrust are inserted between the pylon and the gas generator of the turbojet engine, so as to take up the forces created by the thrust of the engine.

In the propulsion assemblies according to the prior art, these connecting rods are subjected to very high temperatures, in particular created by the combustion chamber of the engine, which requires the use of particular steel alloys, the weight of which is substantial.

The present invention in particular aims to provide means making it possible to use lighter materials for the connecting rods taking up thrust.

This aim of the invention is achieved with a suspension assembly for an aircraft turbojet engine, including a pylon and connecting rods for taking up the thrust of said turbojet engine connected to said pylon, remarkable in that it includes means separate from said pylon for thermally insulating the connecting rods from the turbojet engine.

The presence of thermal insulating means for the connecting rods makes it possible to insulate the latter parts from the radiation and convention of the heat given off by the engine: these rods can therefore be made from lighter and less heat-resistant materials, such as titanium, aluminum, or composite materials.

According to other optional features of the suspension assembly according to the invention:
- said insulating means comprises independent insulating sheaths for each connecting rod taking up thrust: these sheaths make it possible to achieve the insulation of the connecting rods very simply;
- said insulating means comprises an insulating sheath shared by the connecting rods: this solution makes it possible to reduce the number of pieces;
- said sheath(s) are removable: this makes it possible to facilitate the inspection of the connecting rods;
- said thermal insulating means comprises an insulating partition positioned between said connecting rods taking up thrust and the zone intended to be occupied by the turbojet engine: this solution also makes it possible to protect the pylon from heat, and thereby to make at least part of the pylon from composite materials, and therefore further reduce the weight of the assembly;
- said partition is fastened on the pylon and/or on the connecting rods and/or can be fastened on the turbojet engine;
- said partition can act as a firewall in case of fire in the engine compartment, so as to prevent its spread to the connecting rods taking up thrust and the pylon;
- sealing devices are inserted between said insulating partition and the internal structure of said nacelle: the presence of these joints makes it possible to prevent the transfer of heat from the engine by thermal convection, as well as the spread of a flame or hot gases in case of fire in the engine compartment.

BRIEF SUMMARY

The present invention also relates to a propulsion assembly, including a suspension assembly according to the preceding, a turbojet engine suspended from said suspension assembly, and a nacelle surrounding said suspension assembly and said turbojet engine.

Optionally, said propulsion assembly can include channels for taking air in the secondary flow zone of said nacelle, to cool said thermal insulating means: these channels contribute to keeping the connecting rods at a low temperature.

BRIEF DESCRIPTION OF THE DRAWINGS

Other features and advantages of the present invention will appear in light of the following description and upon examining the appended figures, in which:

FIGS. 3 and 4 are front and back views, slightly in perspective, of an assembly according to the invention done according to still another embodiment, FIGS. 5 and 6 are views respectively corresponding to FIGS. 3 and 4, when the assembly according to the invention is shown in the maintenance position;

DETAILED DESCRIPTION

Figure 1:
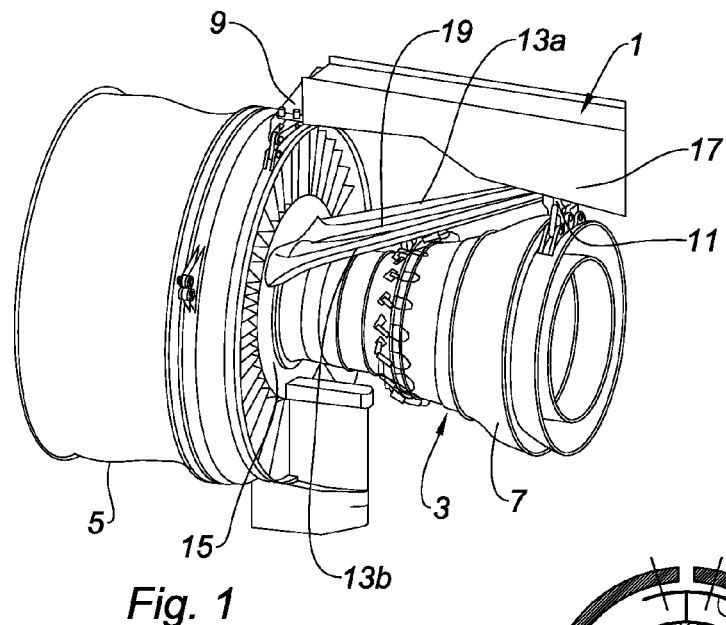
FIG. 1 shows a perspective view of a first embodiment of an assembly according to the invention.

FIG. 1 shows that the assembly according to the invention comprises a pylon 1 intended to be fastened under an airplane wing, adapted to support a turbojet engine 3 including an upstream part forming a fan 5 and a downstream part forming a gas generator 7.

The pylon 1 is respectively connected to these upstream and downstream parts of the turbojet engine 3 by upstream 9 and downstream 11 fittings.

Connecting rods 13a and 13b taking up thrust extend traditionally between the upstream part 15 of the gas generator 7 and the rear part 17 of the pylon 1.

These two connecting rods 13a, 13b are spaced apart from each other in the upstream part 15, and converging towards the rear part 17 of the pylon 1.

A thermal insulating sheath 19, which can be formed for example from a sheet of titanium or steel, or a cover made up of a film of stainless steel encapsulating an insulating material such as silica fiber, simultaneously envelopes the two connecting rods taking up thrust 13a and 13b, thereby forming on the one hand a thermal insulation of these two connecting rods relative to the heat given off by the gas generator 7, and on the other hand a heat protection screen for the pylon 1.

This sheath 19, which envelopes the two connecting rods taking up thrust, is preferably made up of two half-sheaths removably fastened on each other, which makes it possible to quickly access the connecting rods 13a, 13b for a visual examination and/or maintenance operations.

The assembly according to the invention also comprises a nacelle able to surround the turbojet engine 3, not shown in FIG. 1, but shown in FIGS. 3 to 8, which will be discussed later.

Figure 2:
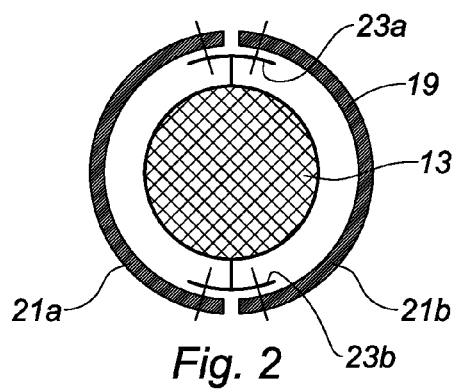
FIG. 2 shows (on a larger scale) a transverse cross-sectional view of a connecting rod taking up thrust of an assembly according to the invention according to another embodiment.

As an alternative solution to a single sheath 19 surrounding the two connecting rods 13a and 13b taking up thrust, it is possible to consider a sheath 19 for each connecting rod 13, as shown in FIG. 2.

As shown in that figure, each sheath 19 can be made up of two half-sheaths 21a, 21b, connected to the connecting rod 13 via sheath supports 23a, 23b.

It should be noted that in the embodiment of FIG. 1 as in that of FIG. 2, the sheath 19 can extend over all or part of the length of the connecting rods 13a and 13b taking up thrust.

It should also be noted that the upstream 9 and downstream 11 fittings can also be covered with thermal insulation sheaths.

In the embodiment of FIGS. 3 to 8, a partition 25 is inserted between the gas generator 7 and the connecting rods 13a and 13b taking up thrust.

These FIGS. 3 to 8 show the nacelle that is part of the assembly according to the invention.

Figure 3:
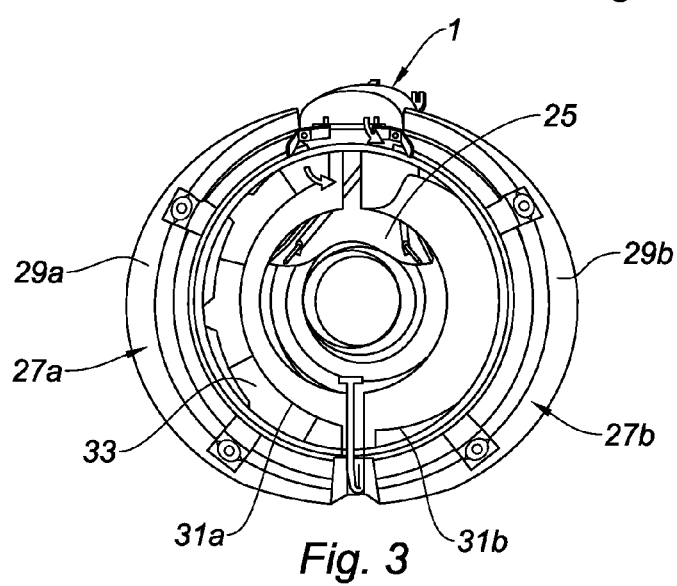
Figure 7:
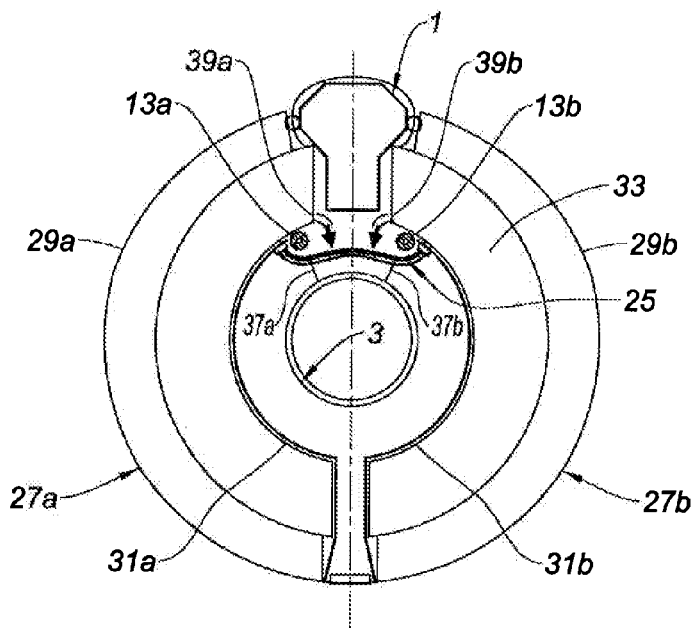
FIGS. 7 and 8 are diagrammatic cross-sectional views of the assembly of FIGS. 3 to 6, respectively shown in the normal operating position and the maintenance position.
Figure 8:
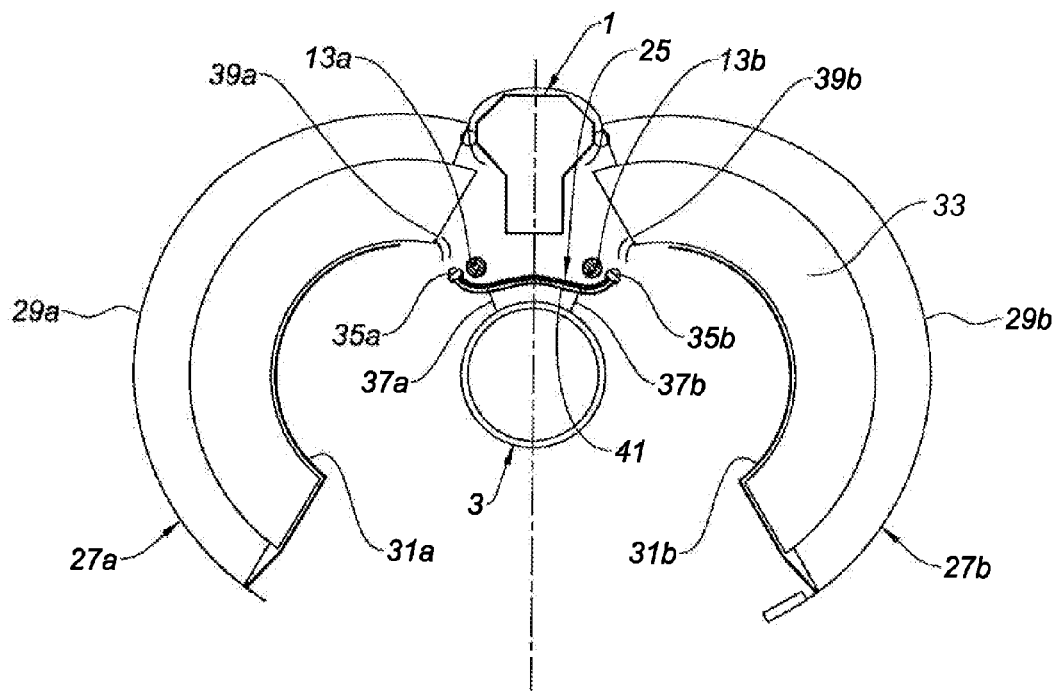
Figure 9:
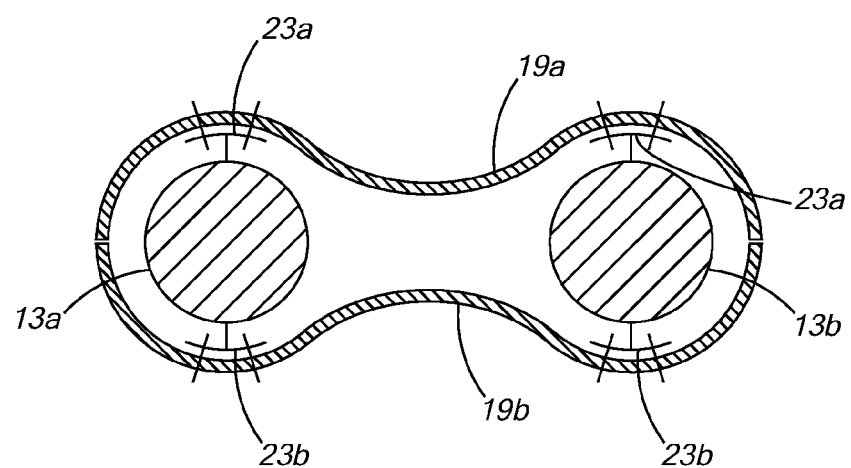
FIG. 9 shows a transverse cross-sectional view of two connecting rods enveloped by a thermal insulating sheath according to FIG. 1.

This nacelle includes two half-shells 27a, 27b, each pivotably mounted around the pylon 1 between a normal operating position shown in FIGS. 3, 4 and 7, and a maintenance position, shown in FIGS. 5, 6, and 8.

Each half-shell 27a, 27b includes an outer structure 29a, 29b, and an inner structure 31a, 31b, these outer and inner structures defining an annular channel 33 in which the cool air sent by the fan 5 circulates.

The partition 25, which extends substantially over the entire length of the gas generator 7, includes, on its lateral edges, joints 35a, 35b cooperating with the internal structures 31a, 31b in the normal operating position (see FIG. 7).

These joints make it possible to produce sealing between the partition 25 and the internal structures 31a, 31b, which makes it possible to perfect the thermal insulation of the connecting rods 13a and 13b taking up thrust and the pylon 1 relative to the gas generator 7.

As shown in particular in FIGS. 7 and 8, the partition 25 can be kept on the gas generator 7 via a support 37a, 37b, but this partition can also be maintained, alternatively or additionally, by supports (not shown) fastened on the connecting rods 13a and 13b taking up thrust.

This partition 25 could also be supported by support means connected to the pylon 1.

Preferably, air intakes 39a, 39b are provided in the cool air flow circulating in the annular channel 33, so as to contribute to keeping the connecting rods 13a and 13b taking up thrust at a low temperature.

It should be noted that the partition 25 can be formed in a material resistant to high temperatures (sheet of titanium or steel for example) or can be coated with a thermal covering 41 withstanding high temperatures, as shown in FIGS. 6 and 8.

The advantages of the present invention result directly from the preceding description: the thermal insulation of the connecting rods 13a and 13b taking up thrust makes it possible to keep these at relatively low temperatures, a fortiori if they are cooled by the air coming from the cold flow created by the fan.

This maintenance at low temperatures makes it possible to produce connecting rods taking up thrust that are made from materials that are less resistant to high temperatures, but are lighter, such as titanium, aluminum, or composite materials.

In the specific case of the embodiment of FIGS. 3 to 8, the partition 25 also makes it possible to insulate the pylon 1 from the heat radiated by the gas generator 7, which makes it possible to consider also making this pylon from lighter materials.

It will be noted that in all of the embodiments described above, visual and physical access to the connecting rods taking up thrust is very easy: in the embodiments of FIGS. 1 and 2, one need only remove the sheaths 19 surrounding the connecting rods taking up thrust; in the embodiment of FIGS. 3 to 8, one need only open the two half-shells 17a and 27b so an operator can immediately check the status of the connecting rods taking up thrust (see FIGS. 5 and 6).

Of course, the present invention is in no way limited to the embodiments described and shown, which have been provided solely as examples.

It will be noted that the present invention can be applied both to a grid or door thrust reverser, or a so-called smooth nacelle (without thrust reverser).

The invention claimed is:

1. A suspension assembly for an aircraft turbojet engine, comprising:
   a pylon and connecting rods, wherein said connecting rods extend from an upstream part of a gas generator of said turbojet engine to a rear part of said pylon and said connecting rods are configured to take up thrust of said turbojet engine connected to said pylon,
   insulating means configured to thermally insulate the connecting rods from the turbojet engine, said insulating means being separate from said pylon.

2. The suspension assembly according to claim 1, wherein said insulating means comprise independent insulating sheaths for each connecting rod taking up thrust.

3. The suspension assembly according to claim 1, wherein said insulating means comprise an insulating sheath shared by the connecting rods.

4. The suspension assembly according to claim 3, wherein said insulating sheath is removable.

5. The suspension assembly according to claim 1, wherein said insulating means comprise an insulating partition positioned between said connecting rods taking up thrust and a zone occupied by the turbojet engine.

6. The suspension assembly according to claim 5, wherein said insulating partition is fastened on at least one of the pylon, the connecting rods and the turbojet engine.

7. The suspension assembly according to claim 5, wherein sealing devices are inserted between said insulating partition and an internal structure of said nacelle.

8. A nacelle surrounding said suspension assembly according to claim 1, wherein said turbojet engine is suspended from said suspension assembly.

9. The nacelle according to claim 8, wherein said nacelle comprises channels configured to receive air in a secondary flow zone of said nacelle and to cool said insulating means.

* * * * *